(12) United States Patent
Gaddipati et al.

(10) Patent No.: US 6,741,672 B2
(45) Date of Patent: May 25, 2004

(54) K-SPACE BASED GRAPHIC APPLICATION DEVELOPMENT SYSTEM FOR A MEDICAL IMAGING SYSTEM

(75) Inventors: Ajeetkumar Gaddipati, Waukesha, WI (US); Conrad J. Dirckx, Milwaukee, WI (US); Roshy James Francis, Waukesha, WI (US); Gabriel Fernandez, Menomonee Falls, WI (US); Mark T. Radick, Muskego, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 92 days.

(21) Appl. No.: 10/150,227

(22) Filed: May 17, 2002

(65) Prior Publication Data

US 2003/0002631 A1 Jan. 2, 2003

Related U.S. Application Data

(63) Continuation-in-part of application No. 09/839,055, filed on Apr. 20, 2001, which is a continuation-in-part of application No. 09/721,233, filed on Nov. 22, 2000.

(51) Int. Cl.[7] ................................................. A61B 6/03
(52) U.S. Cl. .............................. 378/4; 378/901; 382/131
(58) Field of Search ........................... 378/4, 8, 15, 901; 382/131

(56) References Cited

U.S. PATENT DOCUMENTS

| | | | | |
|---|---|---|---|---|
| 6,348,793 B1 | * | 2/2002 | Balloni et al. | ............... 324/309 |
| 6,636,038 B1 | * | 10/2003 | Heid | ........................... 324/314 |
| 2002/0113590 A1 | * | 8/2002 | Haworth et al. | ............ 324/309 |

* cited by examiner

Primary Examiner—David V Bruce
(74) Attorney, Agent, or Firm—Quarles & Brady LLP

(57) ABSTRACT

A sequence description defining the events for traversing k-space during a medical imaging scan is defined through a k-space graphical view, thereby providing an easy programming interface for MR physicists. From the k-space view, data elements can be generated by object-oriented sequence description components in the form of predefined sequences. The data elements generated by the predefined sequences are stored in a table, the lines in the table defining an ordered list of pulse segments associated with each trajectory in k-space, the table can also hold information on time ordering or sequencing of k-space trajectories, desired triggering for each k-space trajectory and similar data objects. The k-space description/configuration of sequences is then translated to a group of downloadable sequence components.

20 Claims, 11 Drawing Sheets

K-SPACE BASED GRAPHIC APPLICATION DEVELOPMENT SYSTEM FOR A MEDICAL IMAGING SYSTEM

CROSS-REFERENCE TO RELATED APPLICATIONS

This application is a continuation-in-part of U.S. patent application Ser. No. 09/839,055 filed Apr. 20, 2001, which is a continuation-in-part of U.S. patent application Ser. No. 09/721,233 filed Nov. 22, 2000.

BACKGROUND OF THE INVENTION

The field of the invention is medical imaging systems, and particularly, systems for developing software applications for such imaging systems.

There are many types of medical imaging systems. The primary distinction between the different systems is the medical imaging modality that is used, such as, x-ray, magnetic resonance, ultrasound or nuclear. In addition, a broad range of capabilities and features are typically offered in each imaging modality. For example, a magnetic resonance imaging ("MRI") system may be offered with a range of polarizing magnetic strengths and configurations and with a range of different optional features such as magnetic resonance angiography ("MRA"), cardiac imaging and functional magnetic resonance imaging ("fMRI").

Despite the many differences, medical imaging systems have a number of basic functions in common. All medical imaging systems include an operator interface which enables a particular image acquisition to be prescribed, a data acquisition apparatus which uses one of the imaging modalities to acquire data from the subject, an image reconstruction processor for reconstructing an image using acquired data, and storage apparatus for storing images and associated patient information. Typically, hardware is designed to carry out these functions and system software is designed and written for each hardware configuration.

A medical imaging system contains application programs which direct the imaging system to perform particular types of scans, image reconstructions and post processing applications. For example, an MRI system may include application software which directs the imaging system to perform a fast spin-echo scan, or a fast gradient-recalled echo scan, or a functional MRI scan, or a cardiac cine scan. The application software also directs the imaging system to reconstruct images from acquired data. Typically, a medical imaging system will include software programs to reconstruct one or more images from a set of acquired data, wherein the example, either stationary skeletal or tissue images, or images of blood flow through a body.

In each of these systems, pulse waveforms, sequencing including RF and gradient waveform synchronization, slice control, and other sequencing functions, and signal acquisition control is achieved by programming the system using conditional logic structures, typically with a high level language such as C, C++, Java or other common programming languages. While these types of programming methods are well-suited to computer scientists and other professionals, the MR physicists responsible for programming pulse sequences on MRI systems are generally not trained in programming, but rather to design diagnostic imaging applications by changing pulses, pulse parameters, and the order in which the pulses are played for different parts of K-space. Therefore, MR physicists typically must be trained to program pulse sequences on the job. Presently, the average time for MR physicists to become proficient in pulse sequence design is said to be around two years. Even after this training period, MR physicists often make mistakes or introduce software bugs in this part of MR Image acquisition applications. Because of the need to program these pulse sequences, typical MR systems therefore waste time and efficiency.

Problems associated with sequence programming are, rather than diminishing, becoming increasingly acute as pulse sequences and acquisition methods become increasingly fast and increasingly complex. As a result of increased complexity, it is also becoming increasingly challenging to keep track of the various synchronization points between RF and gradient waveforms and control packets and, further, to change these parameters depending on the image acquisition protocol state. Currently, an application often switches pulse segments being played (in both number and order) based on current 'phase encode', current 'slice', current 'number of excitation' or current acquisition, and any combination of these states. When more demanding control tasks (e.g., cardiac and respiratory gating/compensation sequencing logic) are added, the complexity of the design is increased quickly. These sequences, therefore, are difficult and time consuming to program correctly, and to monitor to determine whether the programming has been accomplished correctly.

Furthermore, as the number of applications grows, the amount and complexity of the application software code becomes increasingly difficult to maintain. As a result, the addition of new applications to the imaging system becomes increasingly difficult. Furthermore, because of the difficulty of writing and compiling application software, it is extremely difficult for users of medical imaging systems to experiment with new methods of scanning and particularly, of reconstructing data. To modify the scan and reconstruction procedures, trained programmers and a significant degree of down time of the machine can be required.

SUMMARY OF THE INVENTION

The present invention is a method for programming a medical imaging scan sequence in k-space. A user is provided with an interface including a graphic view of k-space for a medical imaging scan illustrating a plurality of case-based trajectories in the k-space. Canned program parameters are assigned to executable sequence description components to provide conditional data directing the flow of logic for sequencing the traversal of k-space. The method can be used to program the events for traversing k-space, or to modify events.

A general object of the invention is to provide a method for programming a sequence description for traversing k-space in a medical imaging system, wherein object data is assigned to each of a plurality of executable sequence description components which define a sequence of events for traversing of k-space. The object data is stored in a class diagram table which provides an ordered list of pulse sequences to be performed in run time.

Preferably, the application development system comprises a series of predefined, executable code segments with defined input and output links. The executable code segments can be dragged and dropped onto a graphic building area, and linked together graphically through the connection points to provide application code, which is serialized and downloaded to application specific processors for execution. The graphic building area comprises a plurality of icons which can be easily linked together with a mouse or other input device, thereby making construction and compilation of an imaging application or a specific segment of an imaging application very easy.

In addition to providing a simple and easy way to program applications, the graphical building area is particularly suited to the development and manipulation of image reconstruction pipelines. Data processing steps for image reconstruction can be graphically modified in real time to modify or improve both collected and visualized data. During real-time processing of an image, the user can modify various parameters, including filtering and threshold parameters, dynamic range and sampling parameters, image resolution, and data flow control in and out of a reconstruction processing pipeline. After a modification has been made, an indication of a change of process and the programming code for processing the acquired data is serialized and downloaded to a data processing board. The data processing board and/or an associated processor preferably translates the programming code to a low level language such as C or assembly which can operate at an appropriate speed to process real-time data. During real-time data acquisition and processing, therefore, a number of data processing parameters and reconstruction parameters can be modified and forwarded to the processing board to modify or improve data imaging and reconstruction.

GENERAL DESCRIPTION OF THE INVENTION

Figure 5:
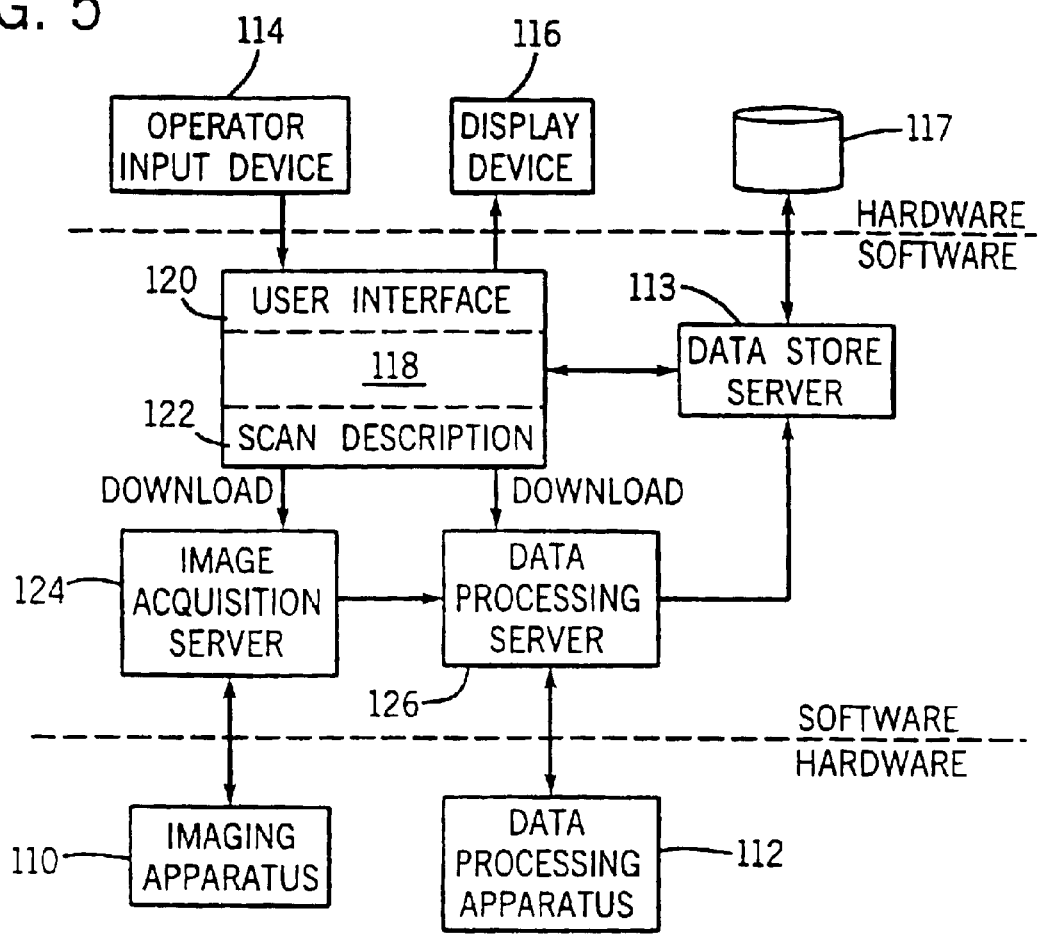
FIG. 5 is a block diagram of an imaging system which employs the present invention.

Referring particularly to FIG. 5, a medical imaging system includes imaging apparatus 110 comprised of mechanical and electrical hardware elements that are operated during a scan to acquire image data. The imaging system also includes data processing apparatus 112 that is operated to reconstruct images using the acquired image data. To operate the system and to enter a scan prescription an operator input device 114, such as a keyboard and control panel, is provided, a display device 116 is provided to present the images for visualization and a storage device 117, such as a hard disc drive, is provided to archive acquired images. The particular imaging modality used, and the complexity and power of these hardware elements varies substantially from one system to the next.

The system includes a workstation 118 which is programmed in a machine independent language, such as Java™, to provide a user interface 120 that enables an operator to enter scan parameters using the operator input device 114. The workstation 118 is programmed to produce a scan description 122, which in its simplest configuration contains image acquisition description components and data processing description components that contain information required by the imaging apparatus 110 and data processing apparatus 112 to perform the prescribed scan.

Prior to run time, a snap shot of the scan description 122 is downloaded to a plurality of servers which control the imaging system hardware apparatus. In the simplest configuration these include an image acquisition server 124 and a data processing server 126 which operate the respective imaging apparatus 110 and data processing apparatus 112. When provided with the scan description components, the servers' programs direct the image system hardware apparatus to perform the prescribed scan. A data store server 113 directs the storage device 117 to save the images along with associated patient information.

The particular scan or operation that is performed by the medical imaging system is directed by an application program stored in the workstation 118.

The application program is produced using an application development system that runs on the workstation 118 or a separate workstation (not shown). The application development system enables the user to create a new application program by selecting objects, or components, written in an object-oriented programming language, from a component library, and assemble them using a visual component assembler. The instance variables of selected components are displayed and may be edited for the new application program. The assembled components are instantiated and saved as a new application program which may be reconstituted for use on the medical imaging system. Instantiation is achieved using a serialization process in which the hierarchical relationship of components and their instance variables are stored.

DESCRIPTION OF THE PREFERRED EMBODIMENT

Figure 1:
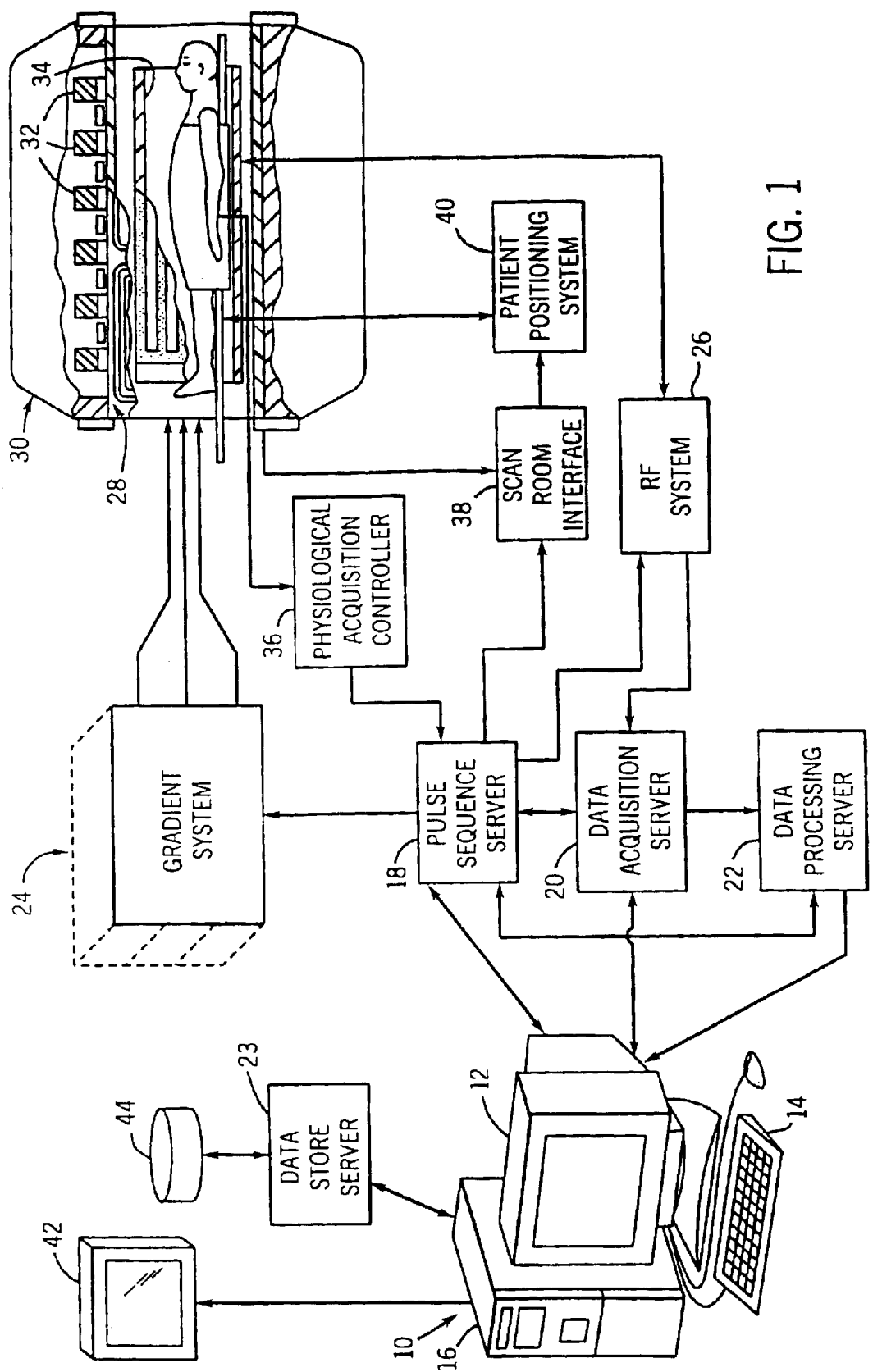
FIG. 1 is a block diagram of an MRI system which employs the preferred embodiment of the invention.

Referring particularly to FIG. 1, the preferred embodiment of the invention is employed to operate an MRI system. The MRI system includes a workstation 10 having a display 12 and a keyboard 14. The workstation 10 includes a processor 16 which is a programmable machine commercially available from Silicon Graphics, Inc. It is based on a 64-bit microprocessor manufactured by Intel and it runs the Linux operating system. The workstation 10 provides the operator interface which enables scan prescriptions to be entered into the MRI system. As will be described in more detail below, the workstation 10 will run one or more Java™ virtual machines which will run code which is programmed in the Java™ language that is fully transportable to any other programmable machine which is Java™ compatible.

The workstation 10 is coupled to four servers: a pulse sequence server 18; a data acquisition server 20; a data processing server 22, and a data store server 23. In the preferred embodiment the data store server 23 is performed by the workstation processor 16 and associated disc drive interface circuitry. The remaining three servers 18, 20 and 22 are performed by separate processors mounted in a single enclosure and interconnected using a 64-bit backplane bus structure based on the PCI standard for industrial and telecommunications applications called "CompactPCI". The pulse sequence server 18 employs a 366 MHz microprocessor model PPC750 and a quad communication controller model MPC860T manufactured by Motorola, Inc. The data acquisition server 20 and data processing server 22 both employ the same 366 MHz microprocessor and the data processing server 22 further includes one or more array processors based on parallel vector processors commercially available from Mercury Computer Systems, Inc. as the PowerPC™. Another 366 MHz microprocessor (not shown) serves as a hardware controller on the PCI bus structure and it controls a quad communication controller model MPC860T manufactured by Motorola, Inc.

The workstation 10 and each processor for the servers 18, 20 and 22 are connected to a 100 Base T Ethernet serial communications network. This serial network conveys data that is downloaded to the servers 18, 20 and 22 from the workstation 10 and it conveys tag data that is communicated between the servers and between the workstation and the servers. In addition, a high speed data link using the BIT3 protocol is provided between the data processing server 22 and the workstation 10 in order to convey image data to the data store server 23.

The pulse sequence server 18 functions in response to program elements downloaded from the workstation 10 to operate a gradient system 24 and an RF system 26. Gradient waveforms necessary to perform the prescribed scan are produced and applied to the gradient system 24 which excites gradient coils in an assembly 28 to produce the magnetic field gradients $G_x$, $G_y$ and $G_z$ used for position encoding NMR signals. The gradient coil assembly 28 forms part of a magnet assembly 30 which includes a polarizing magnet 32 and a whole-body RF coil 34.

RF excitation waveforms are applied to the RF coil 34 by the RF system 26 to perform the prescribed magnetic resonance sequence. Responsive NMR signals detected by the RF coil 34 are received by the RF system 26, amplified, demodulated, filtered and digitized under direction of commands produced by the pulse sequence server 18. Exemplary RF systems are described in U.S. Pat. No. 4,952,877 and U.S. Pat. No. 4,992,736.

The pulse sequence server 18 also optionally receives patient data from a physiological acquisition controller 36. The controller 36 receives signals from a number of different sensors connected to the patient, such as ECG signals from electrodes or respiratory signals from a bellows. Such signals are typically used by the pulse sequence server 18 to synchronize the performance of the scan.

The pulse sequence server 18 also connects to a scan room interface circuit 38 which receives signals from various sensors associated with the condition of the patient and the magnet system. It is also through the scan room interface circuit 38 that a patient positioning system 40 receives commands to move the patient to desired positions during the scan.

It should be apparent that the pulse sequence server 18 performs real-time control of MRI system elements during a scan. As a result, it is necessary that its hardware elements be operated with program instructions that are executed in a timely manner. As will be explained in more detail below, the pulse sequence server 18 is controlled during run-time by programs written in a low level programming language such as assembler, C or C++. The description components for a scan prescription are downloaded from the workstation 10 in the form of objects. The pulse sequence server 18 contains programs which receive these objects using a serialization mechanism. The pulse sequence server 18 also includes a program which converts the objects to C++ objects that are employed by the run-time programs. In the preferred embodiment Java™ objects are downloaded and the Java™ serialization mechanism is employed. The pulse sequence server 18 thus includes both hardware independent programs written in Java™ and hardware dependent programs. It is contemplated that Java™ interpreters will eventually become fast enough that nearly all programs run on the pulse sequence server 18 will be written in hardware independent form.

The digitized NMR signal samples produced by the RF system 26 are received by the data acquisition server 20. The data acquisition server 20 operates in response to description components downloaded from the workstation 10 to receive the real-time NMR data and provide buffer storage such that no data is lost by data overrun. In some scans the data acquisition server 20 does little more than pass the acquired NMR data to the data processor server 22. However, in scans which require information derived from acquired NMR data to control the further performance of the scan, the data acquisition server 20 is programmed to produce such information and convey it to the pulse sequence server 18. For example, during prescans NMR data is acquired and used to calibrate the pulse sequence performed by the pulse sequence server 18. Navigator signals may be acquired during a scan and used to adjust RF or gradient system operating parameters or to control the view order in which k-space is sampled. And, the data acquisition server 20 may be employed to process NMR signals used to detect the arrival of contrast agent in an MRA scan as described in co-pending U.S. patent application Ser. No. 08/635,078 filed Apr. 19, 1996 and entitled "Method For Performing Magnetic Resonance Angiography Using a Contrast Agent". In all these examples the data acquisition server 20 acquires NMR data and processes it in real-time to produce information which is used to control the scan.

As with the pulse sequence server 18, the hardware elements of the data acquisition server 20 are operated at run-time with program instructions in a programming language such as assembler, C or C++. As will be explained in more detail below, the directions for its operation during a scan are downloaded from the workstation 10 in the form of objects. A server proxy receives the objects using the serialization mechanism and the downloaded objects are converted to C++ objects that are employed to operate the data acquisition server 20 during run-time. As indicated above, Java™ objects are downloaded in the preferred embodiment using the Java™ serialization mechanism.

The data processing server 22 receives NMR data from the data acquisition server 20 and processes it in accordance with description components downloaded from the workstation 10. Such processing may include, for example: Fourier transformation of raw k-space NMR data to produce two or three-dimensional images; the application of filters to a reconstructed image; the performance of a back projection image reconstruction of acquired NMR data; the calculation of functional MR images; the calculation of motion or flow images, etc.

Images reconstructed by the data processing server 22 are conveyed back to the workstation 10 where they are stored.

Real-time images are stored in a data base memory cache (not shown) from which they may be output to operator display 12 or a display 42 which is located near the magnet assembly 30 for use by attending physicians. Batch mode images or selected real time images are stored in a host database on disc storage 44. When such images have been reconstructed and transferred to storage, the data processing server 22 notifies the data store server 23 on the workstation 10. The workstation 10 may be used by an operator to archive the images, produce films, or send the images via a network to other facilities.

Directions for the particular operations to be performed by the data processing server 22 are downloaded from the workstation 10. The time critical functions are performed with programs written in assembler, C or C++ and the downloaded Java™ object directions must be converted to corresponding executable code as described above.

Figure 2:
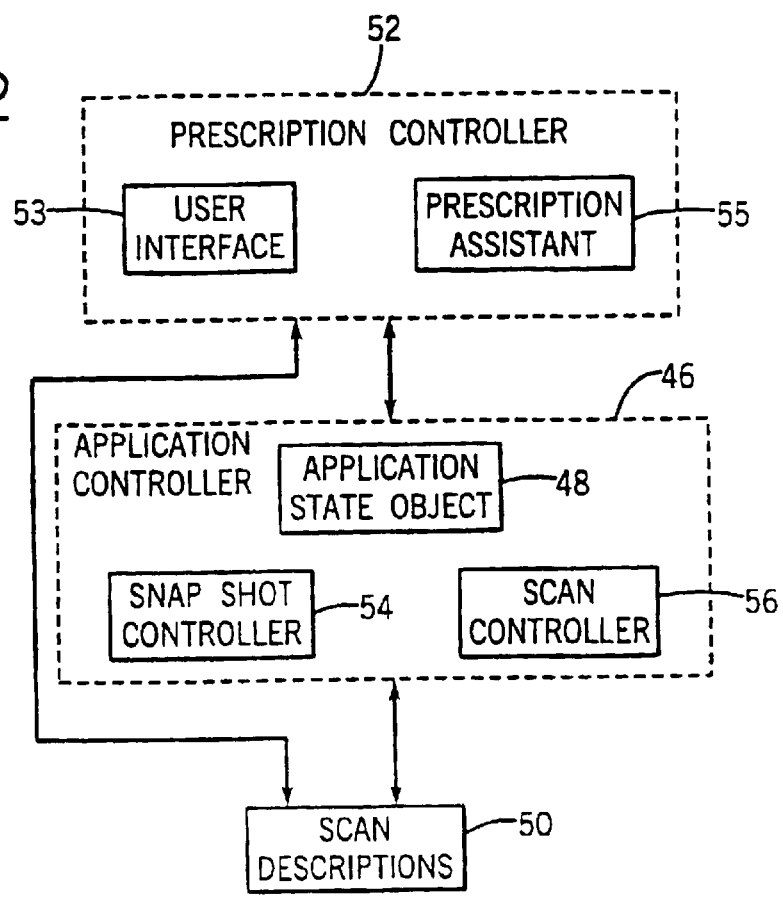
FIG. 2 is a block diagram of functional components in a workstation which forms part of the MRI system of FIG. 1.

As indicated above, the workstation 10 is a Java™ virtual machine which executes programs written in the Java™ programming language. The workstation software is structured to perform "applications" which may be selected and run by an operator. Such applications correspond to clinical imaging procedures and may include, for example:

perform a scan using an FSE pulse sequence;
conduct a CEMRA dynamic study;
perform an fMRI study;
perform a runoff vascular study
perform image post processing
filming
networking An application is a collection of Java™ objects stored in an "application container" that may be selected by an operator to perform a scan. Referring particularly to FIG. 2, each application container includes a Java™ application controller component 46 which directs other Java™ components in the container to perform the scan. These other components include a prescription controller 52 which includes a user interface component 53 and a prescription assistant component 55 that enable an operator to control the procedure performed by the application.

The application container also includes scan descriptions 50. These scan descriptions are downloaded to the servers 18, 20, 22 and 23 (FIG. 1) and used by those servers to perform the prescribed scan. The stored scan descriptions 50 are unique for every different application.

The preferred embodiment of the present invention is an application development system which produces application programs for this MRI system. This application program is a collection of interrelated Java™ objects within the application container Java™ object. These objects are selected and edited using tools in the application development system. The application development system may reside on the MRI system workstation 10, or it may reside on a separate, stand alone workstation of similar structure and capability.

After the application program is developed, the application container object is serialized and stored in the disc storage 44. When the operator of the MRI system selects the application program, the corresponding serialized application container object is read from the disc memory 44 and reconstituted as shown in FIG. 2 to operate the MRI system. To better understand the requirements of the application development system, the operations performed by the MRI system under the direction of the application program will now be described.

The application controller 46 includes an application state object 48 which maintains the state of the application as the scan is performed. The possible states during a life cycle of an application are as follows:

Initialization
Prescribing
Prescribed
Downloading
Downloaded
Prescanning
Prescanned
Batch Scanning
Real Time Scanning
Scan Paused
Scanned
Reconstructed
Visualized.

This life cycle is driven by commands from the application container (like initialize application), by commands from the operator (like start scan) and by commands generated internally by the application (like scan done).

When the operator initially selects the application, the application initializes and changes to the "prescribing state" and the prescription controller 52 is enabled to interact with the scan description components 50 to determine what scan parameters must be specified by the operator (e.g. TR, number of slices, location of FOV, flip angle) and determine if the prescription is complete and valid. The prescription controller 52 then signals the application state object 48 to switch to the "prescribed" state and download, prescan and scan buttons on the control panel are enabled.

If the operator hits the "download" button, the application state object 48 changes to the "download state" and the application controller 46 employs a snap shot controller 54 to issue snap shot and download commands. As will be described in more detail below, these commands cause the scan descriptions 50 to be downloaded to the servers 18, 20, 22 and 23. The snap shot controller 54 receives "download done" notification back from each of the servers 18, 20, 22 and 23, and when all four servers have been downloaded, the application state object 48 is changed to the "downloaded" state.

If the operator hits the scan button, the application state object 48 will change to the scan mode and a scan controller 56 is employed to issue a scan command to the pulse sequence server 18. The next state transition is governed by the scanning mode i.e., real-time or batch. The behavior of the application in the two modes is very different and so there are two different scanning states. If in real-time mode, the application is set to a "real-time scanning" state and if in batch mode, the application state is set to a "batch scanning" state. When in the real-time mode, if the user chooses to pause the scan, the application will transition to a "scan paused" state. If scanning is resumed, the application goes back to the real-time scanning state. In real-time scanning state, the application can be edited and edited descriptions will be downloaded even while the scanning is in progress. However, the application will not make a state transition; instead, the same state will be characterized to allow editing and downloading. It is this behavior of the real-time scanning state that differentiates it from the batch scanning state.

The application will make a transition to the "scanned" state when the operator hits the "stop scan" button. Also, if the application is in the batch scanning mode of operation, the pulse sequence server 18 notifies the application controller 46 when the scan is completed. The application state object changes to the "scanned" state in either event.

When the data processing server 22 completes reconstruction of the acquired images, the application controller 46 is notified and the application state object 48 is changed to the "reconstructed" state. This indicates to the workstation 10 that reconstructed images are available on disk 44 for display or further processing.

The scan descriptions 50 contain a set of components that serve to collect scan parameters using the prescription controller 52, and to organize those prescription scan parameters into a set of smaller components that can be downloaded to the servers 18, 20, 22 and 23. On the servers 18, 20, 22 and 23, those downloaded components direct the operation of the hardware in order to carry out the prescribed scan.

There are different description types within each application to provide logical groupings of components to deal with different aspects of executing an MR scan. These description types are:

Pulse Description;
Sequence Description;
Acquisition Description;
Data Processing Description;
Data Store Description.

The pulse description includes components that define and control the waveforms to be played out on the gradient system and the RF system hardware, along with hardware control components. These components control the dynamic aspects of the waveforms and hardware in response to events produced at run-time by components of the sequence description. This description also includes components that control the filtering of NMR signals received by the RF system 26. These components collectively define a unique set of gradient/RF/control pulses which are used to excite, encode, and readout the NMR signals. Examples are pulse descriptions for 2D spin echo, 2D gradient-echo, 2D fast spin-echo, and 3D gradient-echo sequences.

The sequence description includes a set of components that control the order of pulse sequences played out, and define a series of prescribed events along the scan timeline. These prescribed events defined by the sequence description trigger the dynamic behavior of the pulse components in the pulse description. These components prescribe a unique acquisition ordering used to define the slice and k-space sampling order. Examples are 2D sequential, 2D interleaved, 3D sequential, 3D elliptical centric, and multi-slice CINE.

The acquisition description includes a set of components that prescribe the real-time processing of NMR signals acquired by the RF system 26. These components direct the performance of operations on acquired NMR signals to produce information that is fed back to components in the sequence description to affect subsequent scanner operation. These components may, for example, process NMR signals during a calibration prescan to feedback changes in the power or frequency of RF pulses produced during the subsequent scan; or process NMR signals to detect when a bolus of contrast agent arrives in a region of interest and trigger the start of a centric view order acquisition; or process "navigator" NMR signals to produce phase correction information which may be used to alter the view order of the scan or alter the demodulation reference frequency of the RF system 26. There are scans commonly used in clinical applications which do not require this capability, however, and in those applications, the components in the acquisition description simply buffer or filter the acquired NMR signals and make them available to the data processing server 22.

The data processing description contains components that direct the data processing server 22 to transform acquired NMR signals into a meaningful form. Spectroscopy processing can be defined by these components, in which case the form that results is an image of the spectra of the acquired NMR signals. Image reconstruction is, however, the most common function and the resulting form is a 2D or 3D image of the subject being scanned. Image reconstruction components can include image manipulation functions such as rotating and transposing images; various types of transformation functions including fourier transforms; data sampling, windowing, and filtering functions; sorting and directing collected and manipulated data between a number of possible data manipulation applications, and other applications. Properties of these components can also be modified during scanning to modify the stored and visualized images, as discussed more fully below. Certain components can also be modified during processing of an acquired image, either during operation of a scan or during off-line image processing. These components can include, for example: data filter parameters, threshold values, image resolution values, the control of pipeline parameters directed to data processing, and other data processing parameters.

The data store description contains components that define the images which are stored in the database during a scan. In addition to the reconstructed images, this may include patient information and scan parameter information which is to appear annotated on the image along with the patient anatomic or spectrographic information.

Figure 3:
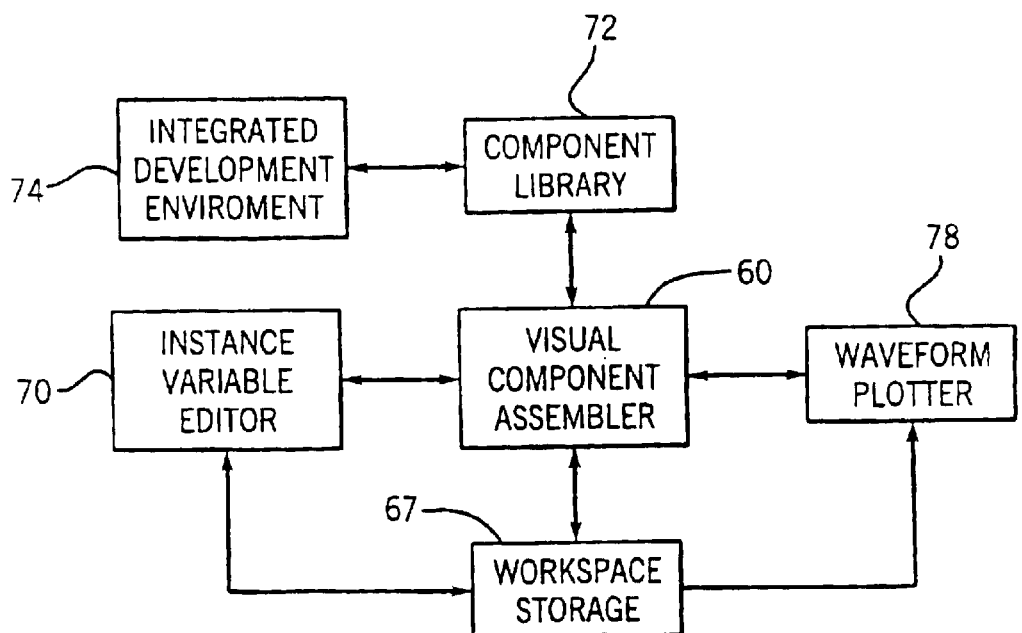
FIG. 3 is a block diagram of the software architecture of a preferred embodiment of an application development system which employs the present invention.
Figure 4:
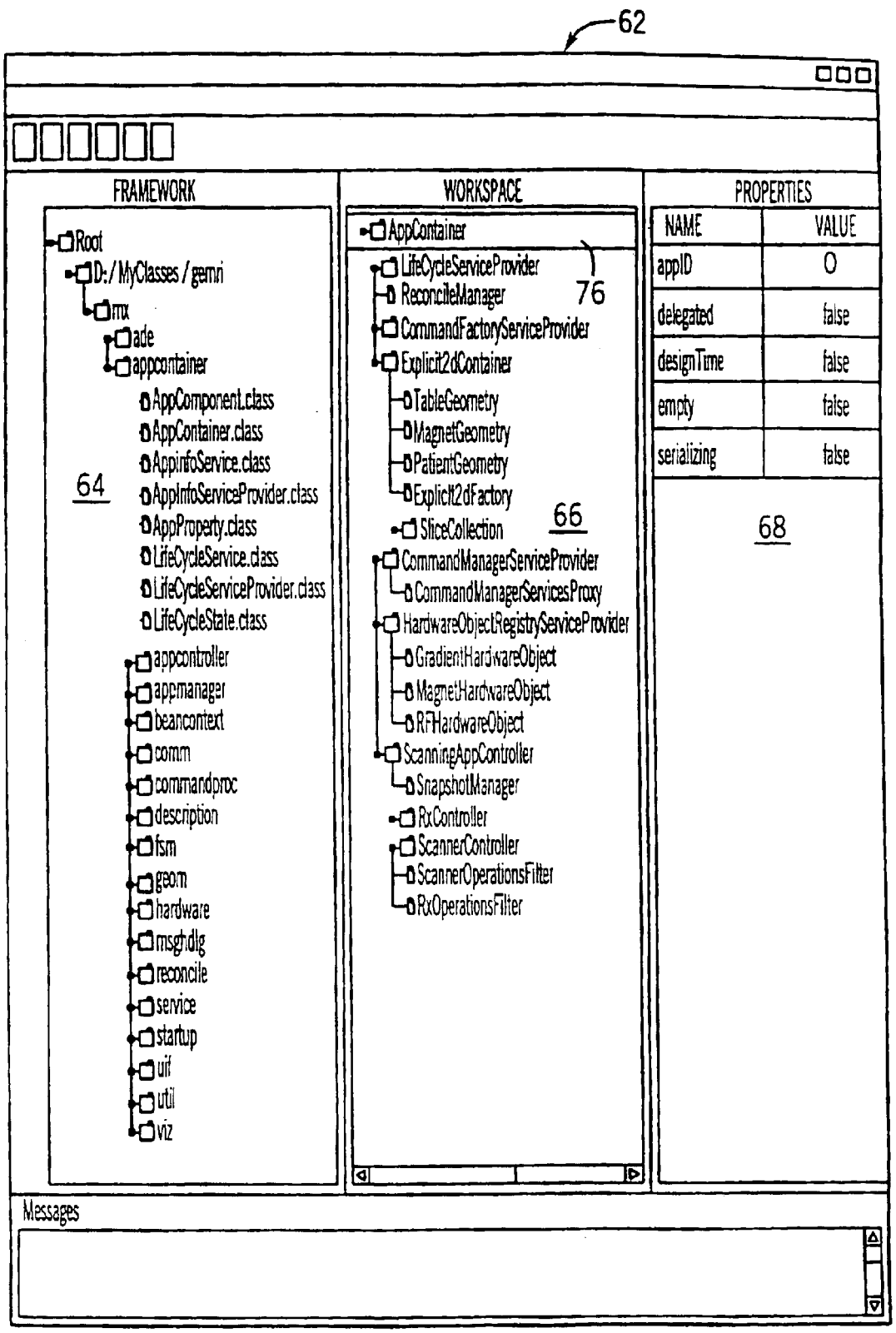
FIG. 4 is a pictorial representation of a display produced by a visual component assembler which forms part of the software architecture of FIG. 3.

As indicated above, the application development system is implemented on a workstation having a memory, a display, an input device such as a keyboard and mouse and a processor programmed to perform the functions now to be described. Referring particularly to FIGS. 3 and 4, the programs and data which form the software architecture of the application development system includes a visual component assembler 60 which produces a window display 62 to the user that contains three areas: a framework area 64; a workspace area 66; and a properties area 68. The application program is developed by selecting components from the component library 72 which are displayed in the framework area 64 and dragging them into the workspace area 66. Such selected components are stored in workspace storage 67. The properties of a selected component in the workspace area 66 are displayed in the properties area 66, and these properties can be changed using an property editor 70.

The components displayed in the framework area 64 are Java™ classes, or objects stored in a component library 72. These components are typically developed using a commercially available integrated development environment 74 such as that sold under the trademark "Forte for Java" by Sun Microsystems or "JBuilder" sold by Inprise. The components are written in Java™ source code and compiled into binary instructions called byte code. These byte code components are saved to the appropriate packages in the component library 72. It can be appreciated that many Java components are commercially available and these can be used along with custom written Java components to create more complex components specifically applicable to performing the MRI functions described above. The objective is to create and store enough components in the component library 72 such that a user can build any desired application by selecting existing components. In such case, the user does not need to write any software code to implement new applications, but is simply requested to select and aggregate the desired functionality.

Figure 6:
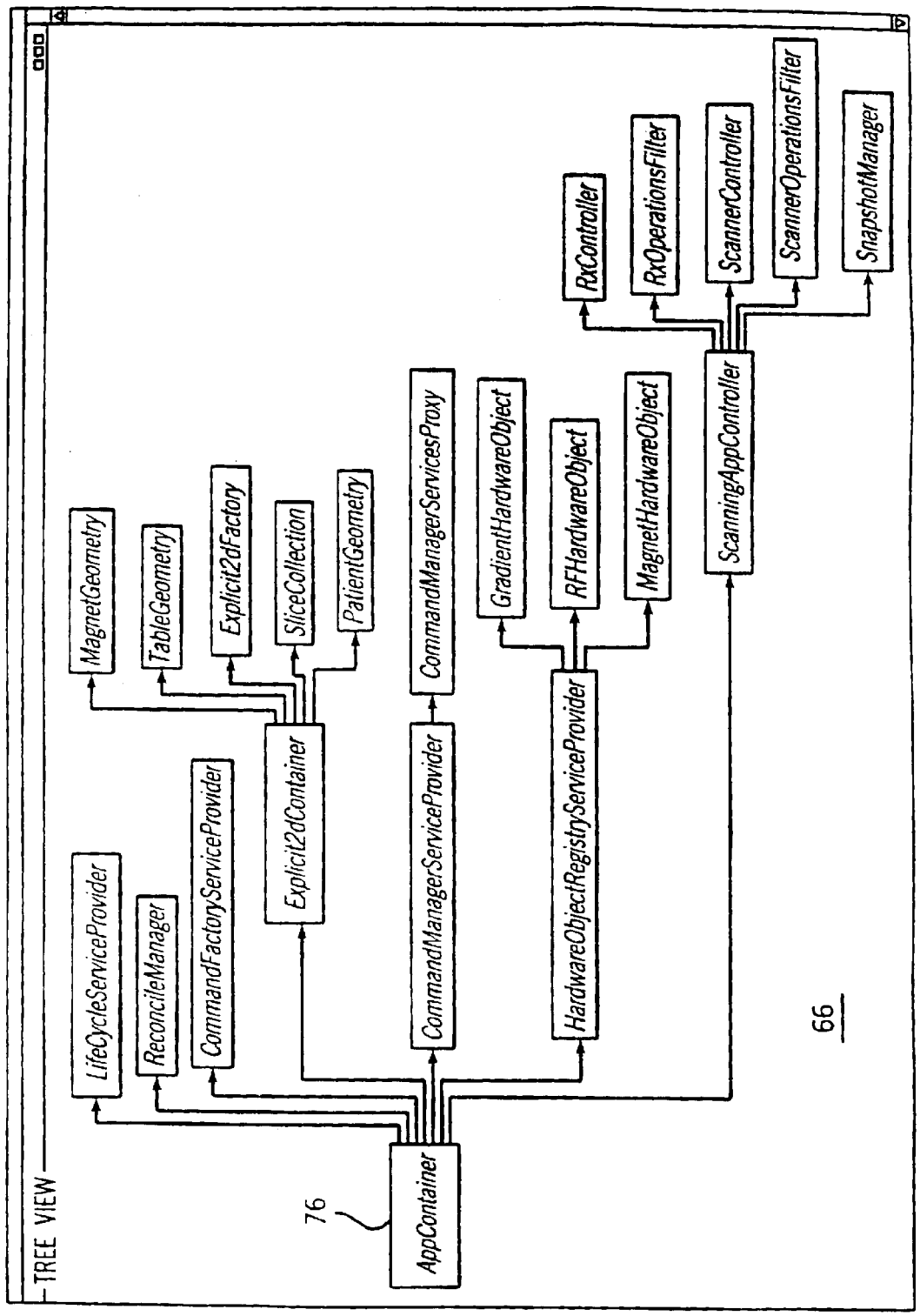
FIG. 6 is a pictorial display of an alternative embodiment of a workspace region in the display of FIG. 4.

Referring particularly to FIGS. 3, 4 and 6, as components are dragged into the workspace 66 from the framework area 64, the visual component assembler 60 establishes the hierarchical relationship between the components. These relationships are illustrated in one preferred manner in FIG. 4 by the indentation of containee component icons beneath their related container component icon. An alternative embodiment of the display of this hierarchical relationship of components in the workspace 66 is shown in FIG. 6. In this embodiment, arrows point from each superclass component icon to its related subclass component icons.

It can be appreciated that the display of a complete application requires more display area than is available and that scroll bars may be used to display different portions of the application in the workspace 66.

To build an application, the user first loads the framework area 64 with the library of components. The components are displayed and an application container component 76 is selected. When this component 76 is dragged to the workspace 66, components for all of its children are also identified. This initiates the building of an application, but the user must know what further components are required to complete the build. To assist in this effort any component in the workspace 66 can be selected with a right click of the mouse and a description of the function performed by that component is displayed in the format known as Javodoc™.

Each component in the workspace 66 has properties, which include numeric variables, Boolean variables and other class type or named variables. The visual component assembler enables the user to display these properties in the properties area 68 by left clicking on a selected component. If the user then left clicks to select one of the displayed properties in the properties area 66, the property editor tool 70 is employed to enable the user to make the change. It is contemplated that most of the new applications created in clinical settings will be limited to changing the properties in components of existing applications. In other words, existing applications are dragged from the framework area 64; the properties in selected components therein are edited; and the result is saved back to the component library 72 as a new application.

When the application is completed the selected components assembled in the workspace area 66 are then persisted. This is currently accomplished by storing the application using the above described serialization mechanism, however, other persistence mechanisms are known and may be used. The persistence mechanism stores the hierarchical relationship ("graph") between the selected components as well as the instance variable (property) values. The byte code for each component in the application is not stored with the persisted application. The medical imaging system which employs the application must itself store the byte code for all the components used in applications. When the persisted application is restored, or "deserialized", on the MRI system, it directs the loading of the byte code indicated by the persisted object graph and instance variable.

Figure 7:
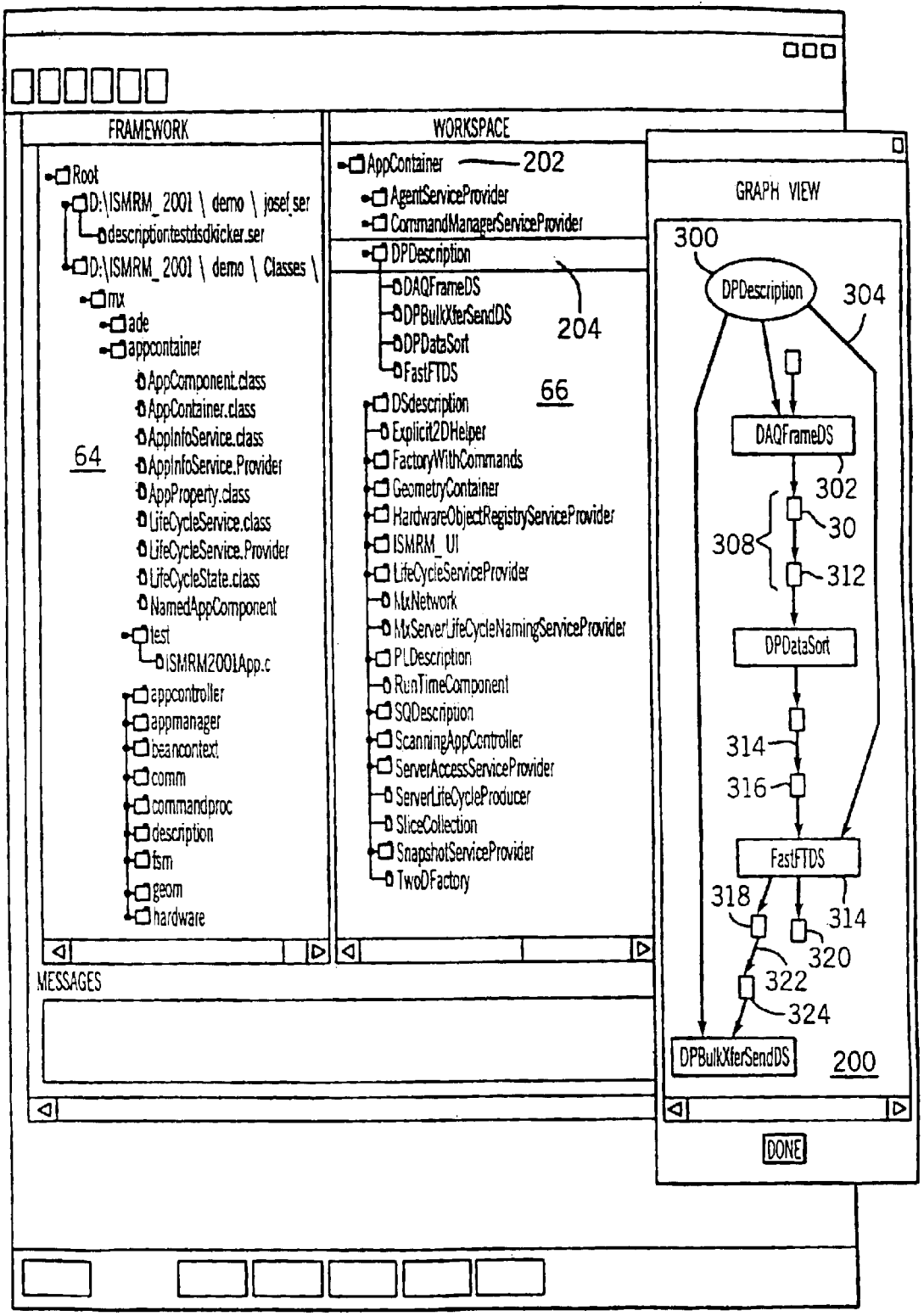
FIG. 7 is a pictorial display of a preferred embodiment of a framework, workspace region and graphic building area in the display of FIG. 4.

Referring now to FIG. 7, an application in which the application development environment includes a framework area 64 and workspace 66 in combination with a graphical building area 200 is shown. The workspace 66 includes a main application container 202, and hierarchically arranged beneath the main folder, a plurality of application description folders. Among the folder structures is a data processing description 204, including a plurality of component folders of executable code for providing various data processing functions. The data processing description 204 will be used by way of example for explaining the graphic building area 200 below. However, it will be apparent that the graphic building method described can be applied to a number of different medical imaging applications, either for performing discrete segments such as scan pulses, or for providing an overall imaging acquisition and reconstruction program.

Referring now to the graphical building area 200 of FIG. 7, three basic types of icons are displayed. These include: containers 300, components 302, and connection points 304. The containers 300, which are structural elements which provide a storage location for a number of executable components 302, are represented as oblongs. The executable components 302 are represented as rectangular icons. Each of the components 302 receives and/or transmits data and therefore includes one or more connection point 308 which can be an input 310 and/or output 312. The inputs 310 and outputs 312 can receive or provide signals in the form of events or data. Generally, the connection point 308 is tied to related data through a code representation such as an address.

Properties of each of the containers 300 and components 302 can be accessed by right clicking on the respective icon with a mouse, thereby accessing the properties of the object allowing the user to edit the properties through an input device 14 (FIG. 1). Properties of the connection point 308 are accessed by dragging a mouse over the icon and activating a tip point or other graphical means of display. Information displayed can include a name of the connection point 308 and the type of data expected at or transmitted from.

To build an application or an application segment such as the data processing segment shown, a container 300 is initially dragged and dropped onto the graphic building area 200 with an input device such as a mouse. The container 300 can be an empty object to which components 302 are added from the workspace 66, or a container 300 such as the data processing description 204 shown, which already contains a plurality of components 302. When a container 300 which includes components 302 is dropped onto the graphic building area 200, the relationship between the container 300 and the components 302 is shown graphically with a plurality of graphic links 304. Other components 302 can be selected from the framework 64 or workspace 66 areas and dropped onto the container 300 to add these components to the container. When components 302 are added in this way, graphical links 304 between the container 300 and the added components 302 are also shown.

As each component 302 is dropped onto the graphic building area 200, connection points 308 illustrating input 310 and output 312 connections for transmitting data or events to and from the component 302 are shown as icons. A predetermined number of input 310 and output 312 connection points 308 are associated with each component 302. Using a mouse, keyboard, or other input device 14 (FIG. 1), the user graphically links successive inputs 310 and outputs 312 by means of a graphical assembly link 314 to provide a data flow through the executable code. The graphical assembly link 314 provides each of the connected components with software references to one another, and thus provides a hierarchical linking of the components 302.

After the components 302 are linked, the code can be serialized and downloaded, as described above, either by linking a specialized download component to the assembled code, or by selecting a download button from the user interface 14 (FIG. 1) of the primary application.

The graphical workspace of FIG. 7 is particularly useful in manipulating a data processing pipeline, allowing users to modify the flow and processing of data graphically in both development and real-time processing operations. As an example, FIG. 7 illustrates a data processing container 302 including a fast Fourier transform component 314. The fast Fourier transform component 314 receives one input signal 316 and provides two output signals 318 and 320, respectively. The input 316 to the Fourier transform is preferably a data stream of acquired image data. The output 318 can comprise an array of magnitude data, while the output 320 comprises an array of phase data, each providing a separate set of information about the acquired image, both of which are useful in processing image data. As shown, a graphic assembly link 322 couples the output 318 to an input 324 to a bulk transfer process 326, which transfers the data for further processing. During a processing application, however, it may be desirable to process the phase data of output 320. To change the processing, the user employs an input device such as a mouse to move the graphic assembly link 322 from the output 318 to the output 320.

By including a specialized program component 302 designed to download an application segment such as the data processing segment shown, the revised application can be downloaded to the data processing server as a separate component, without the need to download an entire image processing application. The workstation 118 downloads the revised code, in this case to the data processing server 126 and data processing apparatus 112 which, in turn, modifies the data flow to provide the phase data represented as output 320 to the bulk transfer process.

Figure 8:
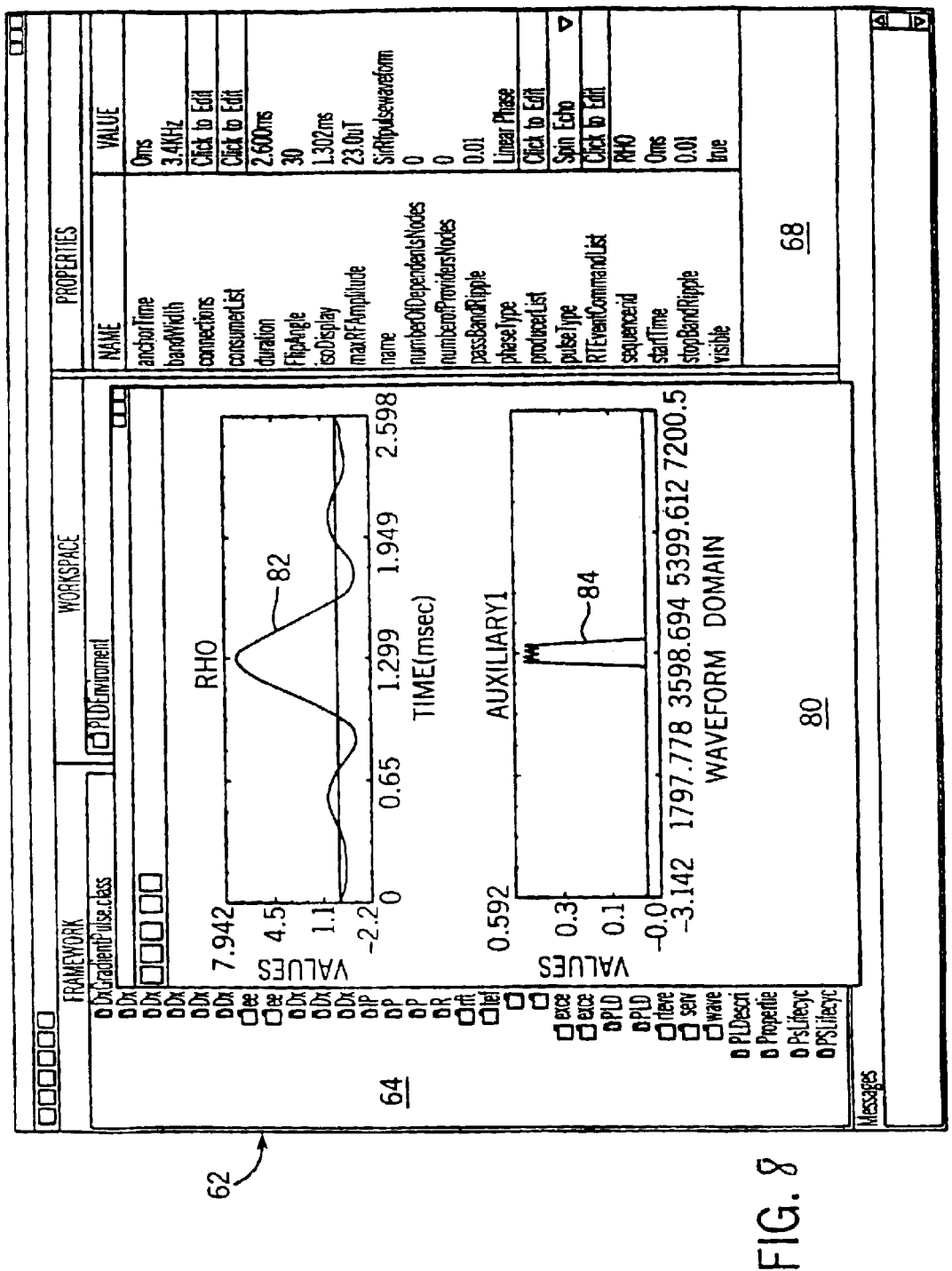
FIG. 8 is a pictorial display of a properties portion of the display in FIG. 4 depicting an rf pulse component.
Figure 9:
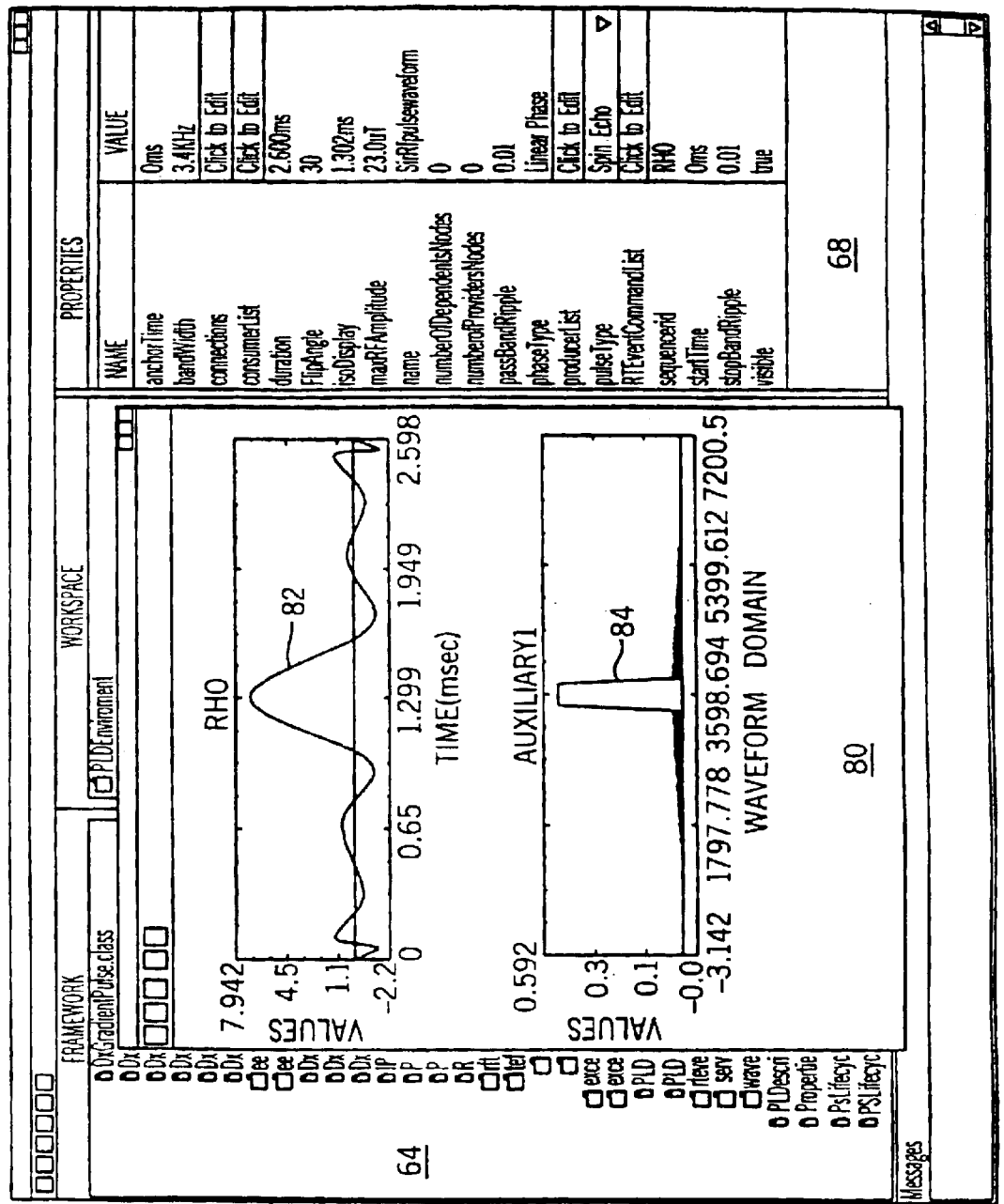
FIG. 9 is a pictorial display showing a graphic plot of the rf pulse component of FIG. 8.

Because many of the components in MRI applications relate to the production of pulses and pulse sequences, another feature of the present invention is the display of waveforms or other data produced by a component. Referring particularly to FIGS. 3, 8 and 9, all components, may include a property called a "visible." In the case of a pulse waveform component, when the visible property is switched to "true", a waveform plotter 78 is enabled and a pulse sequence plotter window 80 is produced and displayed. This window 80 displays the waveforms 82 and 84 which are produced by this instance of the component. If a property is changed using the editor 70, the displayed waveforms may also change. This is illustrated in FIG. 8 when the property "pulse type" is about to be changed.

Figure 10:
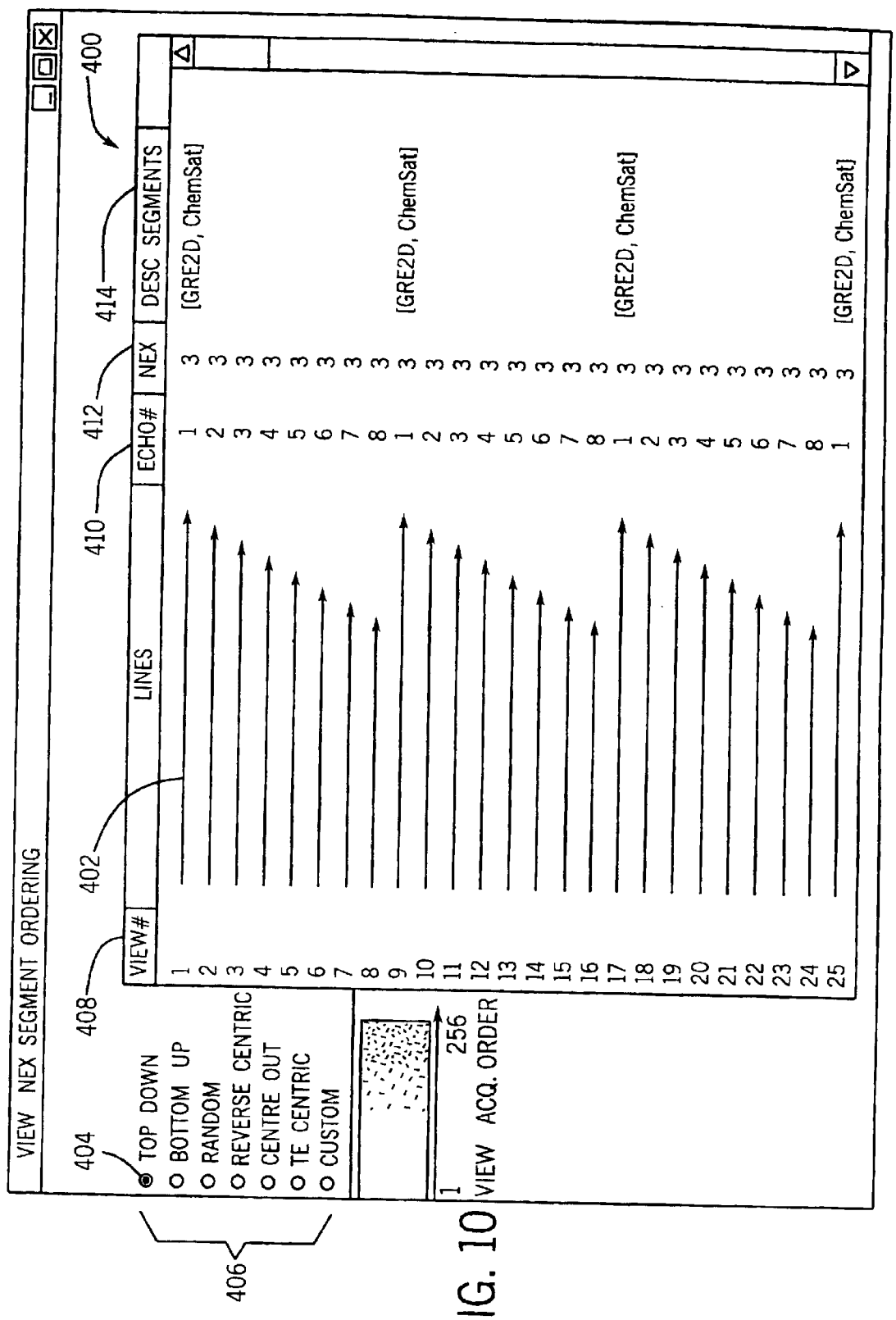
FIG. 10 is a pictorial display of a graphic plot of the traversal of k-space as defined by a sequence description and associated menu for revising the description.

Referring now to FIG. 5, as noted above, a sequence description comprising a set of components for controlling the ordering of pulse sequences in a scan is included as part of the scan description 122. As described above, the sequence description prescribes acquisition ordering for defining the sequence of events performed while traversing k-space. Referring now also to FIG. 10, as described above with reference to the pulse description, the sequence description can be viewed graphically on the new interface 120 of the workstation 118 by selecting a "visible property" as shown in the Properties screen 68 of FIG. 4, which activates the plotter 78 (FIG. 3) to provide a graphic view of k-space 400, and of the traversal of k-space by the selected sequence description.

Referring still to FIG. 10, the graphical view of k-space 400 illustrates a plurality of k-space trajectories 402 and associated data including, for example, view order number 408, echo number 410, number of excitations (NEX) 412 per line, and a description of the pulse sequence or segment to be provided on the selected trajectory 414. Data associated with the sequence of events for traversal of k-space can be shown using both alphanumeric characters, and graphically. Here, for example, view ordering is illustrated graphically, as a function of the color of the trajectory 402. The echo number is also illustrated graphically, as a function of the length of the selected trajectory 402, and numerically in column 3. Although specified as part of a pulse description rather than the sequence description, the pulse sequence 414 to be applied in each trajectory of the k-space are shown in column 4.

Figure 11:
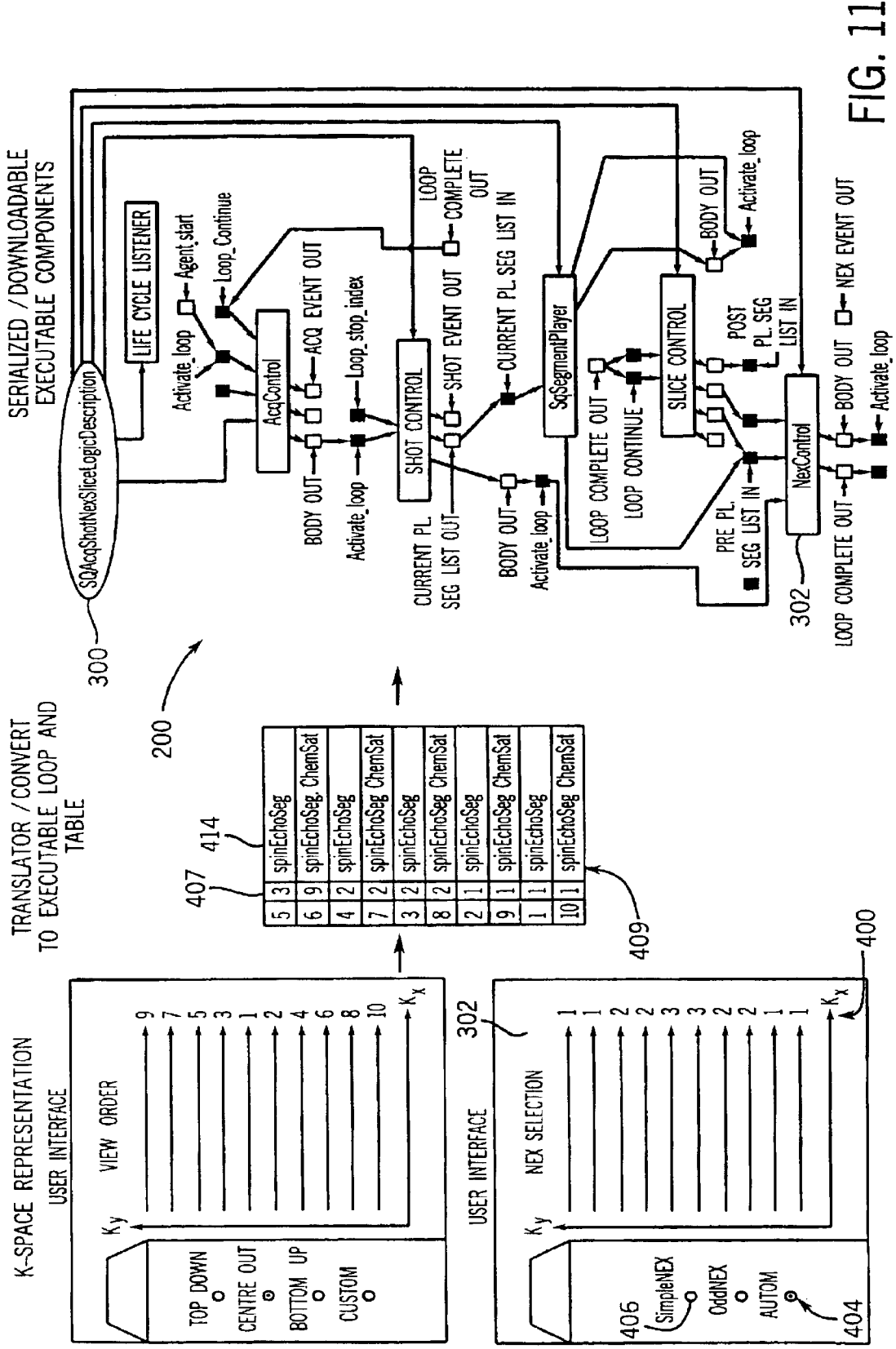
FIG. 11 is a block diagram illustrating entry of data into the k-space graphical view, the associated conditional data table, and the resultant executable code.

Referring still to FIG. 10, the k-space sequence description can also be programmed through or modified through the graphical k-space screen to define the events for traversing k-space during a medical imaging scan. From the k-space view, data elements can be generated by object-oriented sequence description components in the form of predefined sequences. The data elements generated by the predefined sequences are stored in a table, the lines in the table defining an ordered list of pulse segments associated with each trajectory in k-space. The table can also hold information on time ordering or sequencing of k-space trajectories, desired triggering for each k-space trajectory and similar data objects. The k-space description/configuration of sequences are then translated to a group of downloadable sequence components whose interconnection through input/output nodes and use of associated tables allow capturing complex looping and conditional logic associated with MR pulse sequencing (FIG. 11). These components and tables are serialized and downloaded to a runtime server for medical imaging system operation. The software architecture allows for decoupling of the description of sequence acquisition, as defined in k-space, from the downloadable sequence control components used to execute the scan. Each of these steps will be defined more fully below.

Referring still to FIG. 10, a menu structure 404 allows the user to select between a plurality of sequence description executable components for controlling View Order, Slice Select, Number of Excitations (NEX) and other sequencing description parameters. From the menu 404 associated with each sequence component, a user can select among one or more predefined sequence orders 406, which associate object data with the object-oriented sequence components. Shown, for example, is a menu 414 for View Ordering, and associated predefined sequence orders 406. Here, the predefined sequence orders include a Top Down, Bottom Up, Random, Reverse Centric, Center Out, and TE Centric view order. Selecting between these orders associates a defined set of objects for performing the selected function with the selected sequence description component. Note that, in some applications, as shown below, a shot control is used in place of the view order. The shot control provides greater flexibility by allowing groups of trajectories to be programmed together.

Referring now to FIG. 11, each menu selection in the k-space graphical view 400 is associated with an object-oriented executable component 302 providing a conditional logic structure for performing a sequencing function, and the selected predefined sequence order 406 provides condition data for controlling the flow of logic through the conditional logic structures. After the predefined sequence orders are selected, the conditional data associated with each of the selected programs is stored in a data table 409 which provides the information required by the sequence description components 302 to make appropriate branches and loops. Other data required for execution, such as the ordered list of pulse segments 414, can also be included in the data table 409. The tabular data can include, for example, an acquisition number providing conditional data to an acquisition logic component, view number providing conditional data to the view order component, number of excitations providing conditional data to a NEX component, number of slices providing conditional data to a slice component, and ordered list of pulse segments indicating the type of pulse sequence to be executed at each trajectory in k-space. The table 409 can also include triggering data for the trajectory, and other data required to control the sequence component at run time. The table 409 therefore provides an ordered list of pulse sequences to be executed by the executable components 302 as described below.

Referring still to FIG. 11, here, as an example, an object oriented NEX component 302 is shown in the menu 404. At the menu 404, a predefined sequence order 406 is associated with the NEX component 302, and object data, including conditional data for determining the flow of logic through conditional logic structures related to the predefined sequence order 406, is stored in column 407 of the table 409. As a result of the selected programs 406, the ordering of events for traversing k-space is fully defined and can be displayed graphically, as in the graphic building area 200 discussed below. By associating the object data of the predefined sequence orders 406 with the sequence description component 302, required conditional logic data for traversing k-space in the manner described by the selected sequence description is provided without the need for traditional programming of conditional loops.

Figure 12:
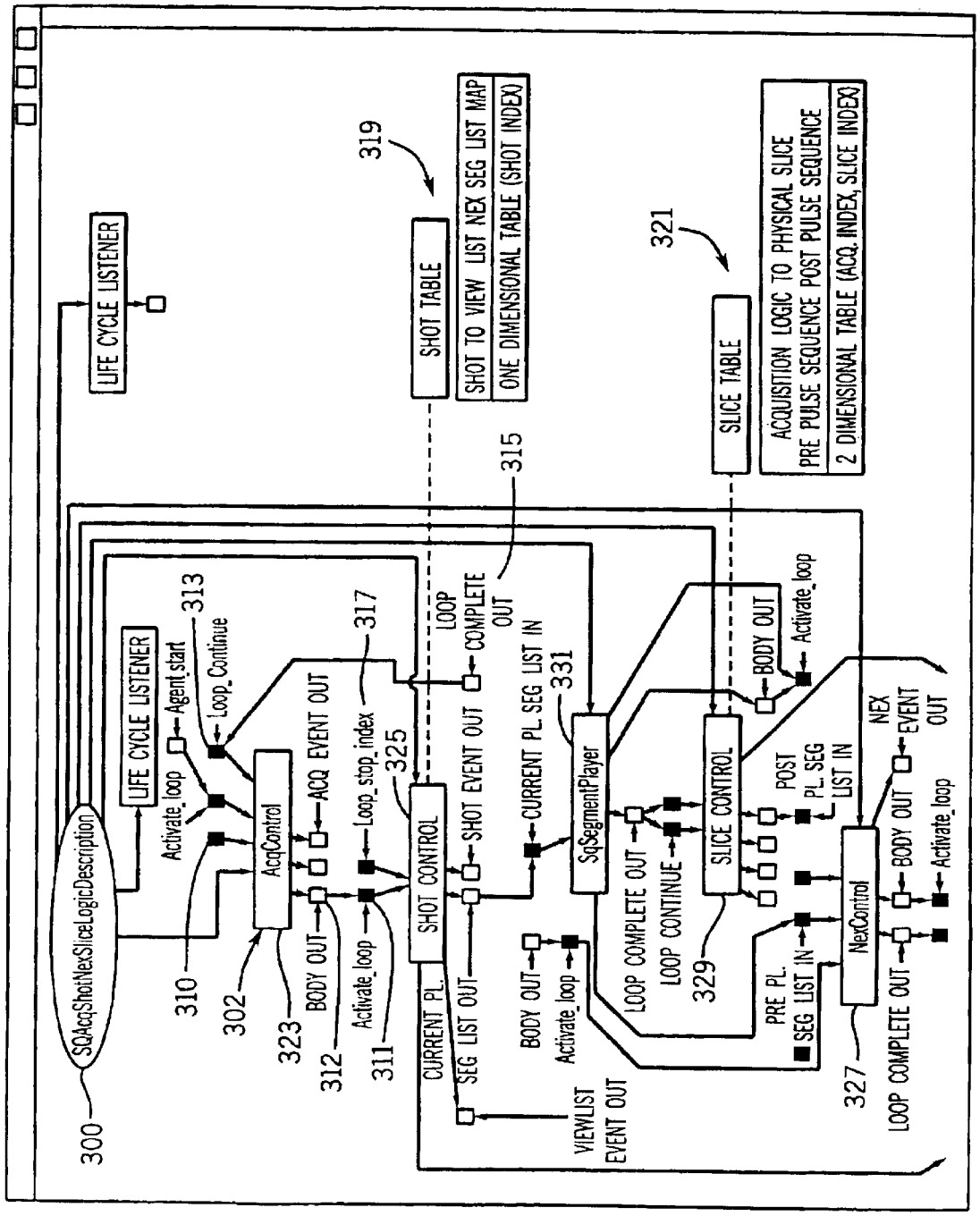
FIG. 12 is a pictorial display of a graphical building area illustrating the nesting of conditional logical structures.

Referring now to FIG. 12, after the sequence description has been defined in the k-space graphical view 400 and condition data stored in the data table 409, the flow of logic associated with the sequence description can be viewed and altered in the graphic building area 200, described above. Here, the sequence description is provided in a container 300 including sequence description executable components 302. As described above, each of the components 302 include input connection points 310, through which both data and commands are received, and output connection points 312 through which data and commands are transmitted. Also as described above, by dragging the graphical links 304 between the input 310 and output 312 connection points, the direction of program flow can be controlled graphically. The graphic building area 200, therefore, provides another level of programming control for reconfiguring a sequence description which is particularly useful to more advanced programmers who wish to customize application sequencing. Although a single table 409 is described and shown in FIG. 11, a number of tables associated with various sequence description components can be provided. For example, a one dimensional table 319 and a two dimensional 321 are shown associated with correlating sequence components in FIG. 12.

Referring still to FIG. 12, each of the components 302 in the sequence description comprises a conditional logic structure. The building area 200 provides a graphical view of loop structure and the nesting of loops in the sequence description which can be dynamically modified through the graphical links 304. Components 302 providing conditional logic include input 310 and output 312 connection points for controlling the flow of logic. For example, the components 302 can include an "Activate Loop" input 311, a "Loop Continue" input 313, a "Loop Stop" input 317, and a "Loop complete" output 315. By selectively connecting these loop control input and output connection points, the logic flow and nesting of loops can be re-configured dynamically. The sequence description components 302 can also be combined with other executable components such as, for example, a cardiac trigger which can be applied, for example, to an "Activate Loop" input 311 or in other ways to control sequencing.

Referring still to FIG. 12, here the sequence description 300 includes an acquisition control 323, for controlling the acquisition of image data during the sequence; a shot control 325, which controls the order in which shots, or groupings of k-space trajectories, are played out during a scan; a NEX control 327, which controls the number of excitations which are played out on each shot; and a slice control 329 which maps logical slice data to physical slices. The segment player 331 controls the actual playing of sequences in k-space as defined by the components described above.

Referring again to FIG. 5, each of the components 302 and associated data tables 409 are serialized and downloaded to a clinical medical imaging system for run time operation as part of the scan description 122, as described below.

When the application is complete, the application container object is serialized and saved to storage. As indicated above, this serialized form of the application program may be restarted in another virtual Java™ machine such as the MRI system described above and reconstituted into an object-oriented application program ready for execution.

One advantage of the serialized configuration of the stored application program is that it can efficiently be downloaded to clinical MRI systems from remote sites. This may be done through direct serial connection using a private Intranet or a public telephone system, or it may be done through the Internet public system, satellite links, or various network connections. In any case, the transfer of the application program is a serialized object stream which carries the class name of each object, or component, as well as that component's instance data which is described by attribute name, type, and value. Also transferred is the relationships between components which allows a graph of the components in the application program to be collected in the serial stream received at the MRI system and then recreated, or reconstituted, on the MRI system. The serialization mechanism follows all relationships between objects. Each object, or component in the graph is only serialized once. Should a component be referenced more than one time, the serialization process recognizes the repeat and inserts a reference to the previous occurrence in the graph. This prevents duplication of objects and reduces the magnitude of the download task.

The serialization process also eliminates the need for downloading byte code. This presumes that any MRI system that receives a downloaded application program has a library which stores the byte code for all components contained in the application program. Updates to clinical systems may, therefore, include both the downloading of new applications as well as the downloading of any necessary new components for the MRI system library.

Of course, the serialization process also enables applications to be uploaded from clinical MRI systems. This enables applications and/or components developed at clinical research systems to be uploaded to the MRI system manufacturer for review and analysis.

The application development system can also be operated in a simulation mode to try out the application program before an actual scan is performed on the MRI system hardware. This simulation capability is facilitated by the fact that the application program will run on any Java™ virtual machine with a suitable component library. It is also facilitated by the fact that the user interface is a component of the application, such that the simulation uses the same interface and displays the same information as when running on an MRI system. Simulation environment is a mode of operation of the application development system which allows a developer to test and debug his/her application in a near-scanner like environment. The Java application loaded in the component assembler collection can be first saved and then simulation may be started. During simulation, the servers are in "simulation mode" and thus certain hardware interfaces are emulated or non-functional. Typically raw data is injected into the server imaging chain to be processed as it would if received by the transceiver.

During application simulation, the developer will have the opportunity to do certain levels of message tracing and component debug. The developer is provided with several levels of component message tracing, which can be set dynamically during application simulation. The developer may also invoke several levels of debug. During component and application development, the developer can set a "debug=TRUE" property in each component in order to access custom debug behavior for that component. Or, there may be several levels of debug for a property, with "0" being none or "debug off". For example, the sequencing component of the sequence description may provide for single stepping of the slice and phase encoding looping. Any custom user interfaces required for a given component are provided by that component in debug mode.

There may also be one or more simulation user interfaces which can be accessed during simulation to provide access to more global operations, such as observing the internal behavior of a specific server, inter-server tag communications or perhaps observing detailed behavior of a specific server, including tags and agent behavior.

What is claimed is:

1. A method for programming a scan sequence in k-space on a medical imaging system, the method comprising the following steps:

providing a user interface including a graphic view of k-space for a medical imaging scan, the graphic illustration including a plurality of case based trajectories in the k-space; and displaying at least one sequence description component associated with the k-space through the user interface, the sequence description component defining a parameter for traversing k-space; and assigning a predefined order parameter to the sequence description component, the predefined order parameters associating conditional data with the downloadable sequence description component for sequencing the traversal of k-space.

2. The method as defined in claim 1, wherein the assigned sequence description component comprises at least one of a number of excitations in each of the lines of k-space, a view ordering for ordering the lines in k-space, and a segment use correlating at least one pulse segment to at least one of the k-space lines.

3. The method as defined in claim 1, wherein the downloadable sequence components and their associated conditional data are serialized and transmitted to a run time server to be deserialized in a real time operating environment.

4. The method as defined in claim 1, wherein the pulse sequence components include a number of excitations control, a view ordering control and a slice select control.

5. The method as defined in claim 1, the graphical k-space view further comprising an alphanumeric character for illustrating the conditional data.

6. The method as defined in claim 1, further comprising the step of graphically illustrating at least one of the sequence description components by assigning one or more color to the trajectories.

7. The method as defined in claim 1, further comprising the step of graphically illustrating at least one of the sequence description components as a function of the length of the trajectories.

8. The method as defined in claim 1, further comprising the step of providing a graphical view of a sequence description defined by the selected sequence description components and conditional data, the graphical view of the sequence description including at least one input connection point and one output connection point to each sequence component and a graphical link between the input connection point and output connection point of successive components, wherein the graphical link defines the flow of logic through the sequence description.

9. The method as defined in claim 8, further comprising the step of dragging and dropping the graphical link to change the direction of the flow of logic.

10. The method as defined in claim 8, wherein each of the sequence description components in the graphical view further comprise at least one input connection point and at least one output connection point for providing a looping function.

11. The method as defined in claim 10, wherein the graphical links between the input connection point and the output connection point for providing a looping function provide a nesting of loops.

12. A method for programming a sequence description for traversing k-space in a medical imaging system, the method comprising the following steps:

assigning object data to each of a plurality of downloadable sequence components, the sequence components defining events for traversing k-space; and storing the object data in a downloadable table, the table providing an ordered list of pulse sequences to be performed in run time.

13. The method as defined in claim 12, further comprising the step of:

serializing the object data with sequence components and downloading them to a medical imaging system for execution in run time.

14. The method as defined in claim 12, wherein the downloadable table includes conditional data for determining the flow of logic through the sequence components to traverse k-space.

15. The method as defined in claim 12, wherein the sequence description components include at least one of a number of excitations (NEX) component, a view ordering component, and a slice component.

16. The method as defined in claim 12, further comprising the step of graphically illustrating k-space and selected sequence description components and associated data defining selected events for traversing k-space.

17. The method as defined in claim 16, further comprising the step of illustrating the selected sequence description components and associated data graphically.

18. The method as defined in claim 16, further comprising the step of illustrating the selected sequence description components and associated data using alphanumeric characters.

19. The method as defined in claim 16, further comprising the step of providing a graphical view of the flow of logic provided in the sequence description, the flow of logic being dynamically modifiable by moving a graphical link between input and output connections associated with each sequence component.

20. The method as defined in claim 19, wherein the sequence components include at least one of an acquisition logic, a view ordering, a slice select, a shot acquisition, and a number of excitations.

* * * * *